United States Patent [19]
Nelson et al.

[11] Patent Number: 5,170,445
[45] Date of Patent: Dec. 8, 1992

[54] DOCUMENT DECOMPRESSING SYSTEM

[75] Inventors: John E. Nelson, Palos Verdes Estates; Gerard J. Papa, Redondo Beach; Teddy W. Berwin, Playa Del Rey, all of Calif.

[73] Assignee: Brooktree Corporation, San Diego, Calif.

[21] Appl. No.: 455,888

[22] Filed: Dec. 21, 1989

Related U.S. Application Data

[63] Continuation of Ser. No. 81,473, Aug. 4, 1987, abandoned.

[51] Int. Cl.$^5$ .............................................. G06K 9/36
[52] U.S. Cl. ................... 382/56; 358/261.1; 358/261.2; 358/261.3
[58] Field of Search ............... 340/731; 358/260-263, 358/426, 261.1, 261.2, 261.3; 382/47, 51, 56

[56] References Cited

U.S. PATENT DOCUMENTS

| | | | |
|---|---|---|---|
| 4,134,133 | 1/1979 | Teramura et al. | 358/261 |
| 4,410,965 | 10/1983 | Moore | 358/260 |
| 4,454,546 | 6/1984 | Mori | 382/56 |
| 4,492,983 | 1/1985 | Yoshida et al. | 358/260 |
| 4,562,484 | 12/1985 | Rallapalli et al. | 358/261 |
| 4,571,634 | 2/1986 | Canechi et al. | 358/260 |
| 4,652,935 | 3/1987 | Endoh et al. | 358/261 |

Primary Examiner—Jose Couso
Attorney, Agent, or Firm—Ellsworth R. Roston; Charles H. Schwartz

[57] ABSTRACT

A code parser decodes coded compressed image information into an intermediate code. A code expander operating asynchronously relative to the code parser decompresses the compressed image information in accordance with such decoded information. A window register in the code parser has a length at least as long as the longest code in the intermediate code. When the intermediate code indicates a pattern in one line in a raster scan of an image corresponding to a pattern in an immediately preceding line, the window register and associated circuitry scan the one line and provide for the decompression in such line in accordance with the decompression at the corresponding positions in the preceding line. Such associated circuitry may include two memories, one for even scan lines and the other for odd scan lines. Alternate ones of the memories are activated for information comparison between adjacent lines during alternate line scans. When the same color is to be printed at a number of successive positions in a line, a counter is set to count such number in the expanded line. During this count, the same color is output. The code parser requests successive codes from an external source and acknowledges the receipt of such successive codes. The code expander receives new codes and expansion instructions from the code parser and acknowledges the receipt of such codes. Under certain circumstances, the code parser may not operate on the next code until the code expander has decompressed the information represented by the previous code.

28 Claims, 6 Drawing Sheets

IMAGE DECOMPRESSING SYSTEM

FIG. 1 IMAGE DECOMPRESSING SYSTEM

FIG. 2 CODE PARSER

| \multicolumn{8}{c}{TERMINATING CODES} |||||||||
|---|---|---|---|---|---|---|---|
| WHITE RUN LENGTH | CODE WORD | BLACK RUN LENGTH | CODE WORD | WHITE RUN LENGTH | CODE WORD | BLACK RUN LENGTH | CODE WORD |
| 0 | 00110101 | 0 | 0000110111 | 32 | 00011011 | 32 | 000001101010 |
| 1 | 000111 | 1 | 010 | 33 | 00010010 | 33 | 000001101011 |
| 2 | 0111 | 2 | 11 | 34 | 00010011 | 34 | 000011010010 |
| 3 | 1000 | 3 | 10 | 35 | 00010100 | 35 | 000011010011 |
| 4 | 1011 | 4 | 011 | 36 | 00010101 | 36 | 000011010100 |
| 5 | 1100 | 5 | 0011 | 37 | 00010110 | 37 | 000011010101 |
| 6 | 1110 | 6 | 0010 | 38 | 00010111 | 38 | 000011010110 |
| 7 | 1111 | 7 | 00011 | 39 | 00101000 | 39 | 000011010111 |
| 8 | 10011 | 8 | 000101 | 40 | 00101001 | 40 | 000001101100 |
| 9 | 10100 | 9 | 000100 | 41 | 00101010 | 41 | 000001101101 |
| 10 | 00111 | 10 | 0000100 | 42 | 00101011 | 42 | 000011011010 |
| 11 | 01000 | 11 | 0000101 | 43 | 00101100 | 43 | 000011011011 |
| 12 | 001000 | 12 | 0000111 | 44 | 00101101 | 44 | 000001010100 |
| 13 | 000011 | 13 | 00000100 | 45 | 00000100 | 45 | 000001010101 |
| 14 | 110100 | 14 | 00000111 | 46 | 00000101 | 46 | 000001010110 |
| 15 | 110101 | 15 | 000011000 | 47 | 00001010 | 47 | 000001010111 |
| 16 | 101010 | 16 | 0000010111 | 48 | 00001011 | 48 | 000001100100 |
| 17 | 101011 | 17 | 0000011000 | 49 | 01010010 | 49 | 000001100101 |
| 18 | 0100111 | 18 | 0000001000 | 50 | 01010011 | 50 | 000001010010 |
| 19 | 0001100 | 19 | 00001100111 | 51 | 01010100 | 51 | 000001010011 |
| 20 | 0001000 | 20 | 00001101000 | 52 | 01010101 | 52 | 000000100100 |
| 21 | 0010111 | 21 | 00001101100 | 53 | 00100100 | 53 | 000000110111 |
| 22 | 0000011 | 22 | 00000110111 | 54 | 00100101 | 54 | 000000111000 |
| 23 | 0000100 | 23 | 00000101000 | 55 | 01011000 | 55 | 000000100111 |
| 24 | 0101000 | 24 | 00000010111 | 56 | 01011001 | 56 | 000000101000 |
| 25 | 0101011 | 25 | 00000011000 | 57 | 01011010 | 57 | 000001011000 |
| 26 | 0010011 | 26 | 000011001010 | 58 | 01011011 | 58 | 000001011001 |
| 27 | 0100100 | 27 | 000011001011 | 59 | 01001010 | 59 | 000000101011 |
| 28 | 0011000 | 28 | 000011001100 | 60 | 01001011 | 60 | 000000101100 |
| 29 | 00000010 | 29 | 000011001101 | 61 | 00110010 | 61 | 000001011010 |
| 30 | 00000011 | 30 | 000001101000 | 62 | 00110011 | 62 | 000001100110 |
| 31 | 00011010 | 31 | 000001101001 | 63 | 00110100 | 63 | 000001100111 |

| MAKE-UP CODES |||| 
|---|---|---|---|
| WHITE RUN LENGTHS | CODE WORD | BLACK RUN LENGTHS | CODE WORD |
| 64 | 11011 | 64 | 0000001111 |
| 128 | 10010 | 128 | 000011001000 |
| 192 | 010111 | 192 | 000011001001 |
| 256 | 0110111 | 256 | 000001011011 |
| 320 | 00110110 | 320 | 000000110011 |
| 384 | 00110111 | 384 | 000000110100 |
| 448 | 01100100 | 448 | 000000110101 |
| 512 | 01100101 | 512 | 0000001101100 |
| 576 | 01101000 | 576 | 0000001101101 |
| 640 | 01100111 | 640 | 0000001001010 |
| 704 | 011001100 | 704 | 0000001001011 |
| 768 | 011001101 | 768 | 0000001001100 |
| 832 | 011010010 | 832 | 0000001001101 |
| 896 | 011010011 | 896 | 0000001110010 |
| 960 | 011010100 | 960 | 0000001110011 |
| 1024 | 011010101 | 1024 | 0000001110100 |
| 1088 | 011010110 | 1088 | 0000001110101 |
| 1152 | 011010111 | 1152 | 0000001110110 |
| 1216 | 011011000 | 1216 | 0000001110111 |
| 1280 | 011011001 | 1280 | 0000001010010 |
| 1344 | 011011010 | 1344 | 0000001010011 |
| 1408 | 011011011 | 1408 | 0000001010100 |
| 1472 | 010011000 | 1472 | 0000001010101 |
| 1536 | 010011001 | 1536 | 0000001011010 |
| 1600 | 010011010 | 1600 | 0000001011011 |
| 1664 | 011000 | 1664 | 0000001100100 |
| 1728 | 010011011 | 1728 | 0000001100101 |
| EOL* | 000000000001 | EOL* | 000000000001 |

\* EOL IS NOT DEFINED IN GROUP IV

FIG. 9

| COLOR REGISTER SETTINGS |||
|---|---|---|
| STARTING COLOR | CODE TYPE | NEXT COLOR |
| WHITE | HORIZONTAL | BLACK |
| BLACK | HORIZONTAL | WHITE |
| WHITE | VERTICAL | BLACK |
| BLACK | VERTICAL | WHITE |
| WHITE | PASS | WHITE |
| BLACK | PASS | BLACK |
| WHITE | END-OF-LINE | WHITE |
| BLACK | END-OF-LINE | WHITE |

FIG. 6

| MAKE-UP CODES FOR MACHINE WHICH ACCOMMODATE LARGE PAPER WIDTH ||
|---|---|
| RUN LENGTH (BLACK AND WHITE) | MAKE-UP CODES |
| 1792 | 00000001000 |
| 1856 | 00000001100 |
| 1920 | 00000001101 |
| 1984 | 000000010010 |
| 2048 | 000000010011 |
| 2112 | 000000010100 |
| 2176 | 000000010101 |
| 2240 | 000000010110 |
| 2304 | 000000010111 |
| 2368 | 000000011100 |
| 2432 | 000000011101 |
| 2496 | 000000011110 |
| 2560 | 000000011111 |

FIG. 8

| GROUP III AND GROUP IV CODE EXPANSION INSTRUCTIONS |||
|---|---|---|
| CODE TYPE | GERATIUM CODE | OPERAND |
| HORIZONTAL RUN LENGTH | 000 | 6 BIT NONNEGATIVE BINARY NUMBER RANGING FROM 0-63 |
| HORIZONTAL MAKE-UP CODE | 001 | 6 BIT BINARY NUMBER RANGING FROM 0-63 |
| VERTICAL | 011 | 6 BIT TWO'S COMPLEMENT BINARY INTEGER RANGING FROM -32 TO +32 |
| PASS | 010 | 0 |
| END-OF-LINE (END-OF-BLOCK) | 111 | NONE. |

TWO-DIMENSIONAL CODE TABLE

| MODE | ELEMENTS TO BE CODED | | NOTATION | CODE WORD |
|---|---|---|---|---|
| PASS | $b_1, b_2$ | | P | 0001 |
| HORIZONTAL | $a_0a_1, a_1a_2$ | | H | $001+M(a_0a_1)+M(a_1a_2)$ (see Note) |
| VERTICAL | $a_1$ just under $b_1$ | $a_1b_1 = 0$ | V(0) | 1 |
| | $a_1$ to the right of $b_1$ | $a_1b_1 = 1$ | $V_R(1)$ | 011 |
| | | $a_1b_1 = 2$ | $V_R(2)$ | 000011 |
| | | $a_1b_1 = 3$ | $V_R(3)$ | 0000011 |
| | $a_1$ to the left of $b_1$ | $a_1b_1 = 1$ | $V_L(1)$ | 010 |
| | | $a_1b_1 = 2$ | $V_L(2)$ | 000010 |
| | | $a_1b_1 = 3$ | $V_L(3)$ | 0000010 |
| EXTENSION | 2-D (extensions) | | | 0000001xxx |
| | 1-D (extensions) | | | 000000001xxx (see Note 2) |

Note 1 – Code M( ) of the horizontal mode represents the code words in Tables 1/T.4 and 2/T.4.
Note 2 – It is suggested the uncompressed mode is recognized as an optional extension of the two-dimensional coding scheme for Group 3 apparatus. The bit assignment for the xxx bits is 111 for the uncompressed mode of operation whose code table is given in Table 4/T.4.
Note 3 – Further study is needed to define other unspecified xxx bit assignments and their use for any further extensions.
Note 4 – If the suggested uncompressed mode is used on a line designated to be one-dimensionally coded, the coder must not switch into the uncompressed mode following any code word ending in the sequence 000. This is because any code word ending in 000 followed by a switching code 000000001 will be mistaken for an end-of-line code.

FIG. 7

DOCUMENT DECOMPRESSING SYSTEM

This is a continuation of application Ser. No. 081,473 filed Aug. 4, 1987, now abandoned.

BACKGROUND OF THE INVENTION

This invention relates to apparatus for decoding and decompressing image coded compressed image information. More particularly, this invention relates to apparatus for decoding and decompressing coded compressed image information efficiently and reliably without any back tracking in the input compressed code stream or reference image information.

Imagery which has been rasterized and digitized can be compressed using Huffman coding techniques (reference 1) to encode "features" of the images. Features which are typically encoded are run-lengths of a given color within a given raster line and color change correlation between successive raster lines. Using the Huffman coding technique, these features are encoded into a set of binary codes of variable length based on the statistics of a set of sample images. Examples of this image compression technique are the CCITT Group III and Group IV algorithms. These algorithms are well known in the prior art.

The CCITT Group III and Group IV compression algorithms typically result in a relatively high compression ratio of the number of binary bits contained in the original image to the number of binary bits contained in the compressed image. For black and white (binary pel) imagery containing text, symbols and graphics, the compression ratio can typically range from 5:1 to 50:1. The processing, identification and reconstruction can be performed by software.

The CCITT Group III and Group IV compression algorithms are frequently used to minimize the storage and transmission requirements of equipment which handles scanned images, such as facsimile equipment. Because the image expansion apparatus should produce expanded images at a rate commensurate with the speed of the image output device, such as a printer or raster display, with which it communicates, it is advantageous to utilize high speed image electronics for image decompression. The input rate of image output devices can range from two hundred thousand (200,000) pels (pixels) per second for a facsimile machine to one hundred million (100,000,000) pels (pixels) per second for a laser printer or Cathode Ray Tube (CRT) display.

In order to reconstruct the coded images, known as expansion or decompression, the code stream is processed, individual digital code words identified and the encoded features of the original image reconstructed. CCITT Group III and Group IV decompression has been implemented with software operating on a standard computer or microprocessor. The decompression speed of software operating on microprocessor and using CCITT Group III and Group IV algorithms, while adequate for facsimile equipment, is frequently many times slower than the speed of high speed output devices such as a laser printer. As a result, high speed output equipment must utilize specialized image decompression circuitry.

This invention relates to direct circuit means of decompressing imagery which has been compressed by using CCITT Group III, CCITT Group IV or similar algorithms which employ Huffman coding or modified Huffman coding to compress run lengths of a given color and color change correlation between successive raster lines. Such direct circuit means operates on a digital basis. Such direct circuit means is preferably constructed of identical semiconductor technology as a microprocessor. Because of its specialized structure, such circuit means preferably utilizes a comparable number of logic gates, but achieves a processing speed many times greater than the processing speed obtained by a microprocessor in providing decompression.

In one embodiment of the invention, a code parser decodes coded compressed image information. The image information may be disposed on a document or on a cathode ray tube. A code expander operating asynchronously relative to the code parser decompresses the compressed image information in accordance with the decoding of such information by the code parser. A code window register in the code parser has a length at least as long as the longest code in the coded compressed image information. When the code indicates a compression in one line in a raster scan corresponding (or substantially corresponding) to a compression in a previous line in the raster scan, the reference window register and associated circuitry scan the line and provide for the decompression in the line being scanned in accordance with the decompression at the (substantially) corresponding positions in the preceding line (reference 2).

The associated circuitry may include two memories, one for even scan lines and the other for odd scan lines. Other embodiments of this invention may use a common shared memory to storage. Alternate ones of the memories are activated for information comparison between adjacent lines during alternate line scans. When the same color is to be printed at a number of successive positions in the line being scanned, a counter is set to indicate such number and to count such number as the line is being scanned. During this count, the same color is output.

The code parser requests successive codes from an external source and acknowledges the receipt of such successive codes. The code expander receives new codes and expansion instructions from the code parser and acknowledges the receipt of such codes. Under certain circumstances, the code parser may not operate on the next code until the code expander has decompressed the information represented by the previous code. The code expander provides the decompressed image information at its output.

In the drawings:

FIGS. 4–7 set forth modified Huffman codes for CCITT Groups III and IV compression algorithms;

DETAILED DESCRIPTION

Figure 1:
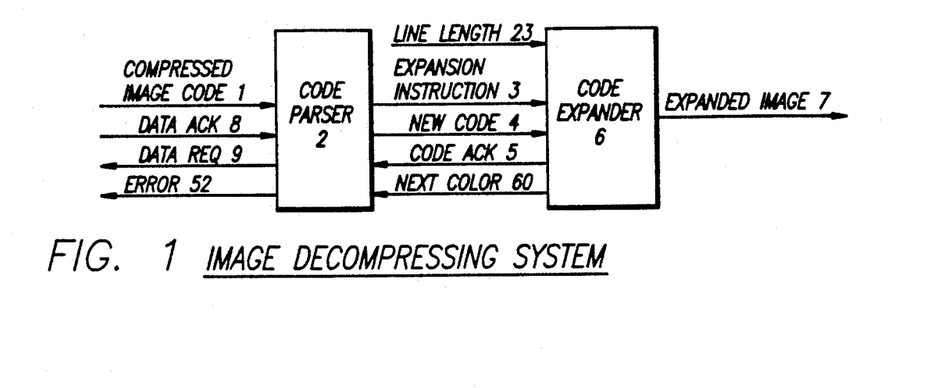
FIG. 1 is a schematic diagram in block form of a code parser and a code expander and the interrelationship between them to constitute one embodiment of the invention for decompressing previously compressed image information.

FIG. 1 illustrates the overall structure of the decompression circuit which can be viewed as two sequential logical circuits, the code parser 2 and the code expander 6, The code parser 2 and the code expander 6 operate asynchronously to decompress imagery as a flow-through process without backtracking and without using external memory for storing intermediate data or control information. When decompressed, the imagery may be recorded on a document but it can also be provided on a display member such as a cathode ray tube.

The code parser 2 identifies and separates individual code words from the code stream and creates a control program containing one or more instructions which have operation code and operand information. Such operation code and operand information are used to control programs created by the code parser 2 to generate the features specified by the code stream to reconstruct the compressed image.

CODE PARSER, GENERAL

The code parser 2 receives the code stream representing the compressed image to be decompressed. The code parser identifies and extracts code words which are of variable length without separation codes and which are characteristic of Huffman codes. The input code stream may be either serial or parallel on predefined data word boundaries as would be characteristic of an internal computer data bus or memory organization.

Figure 2:
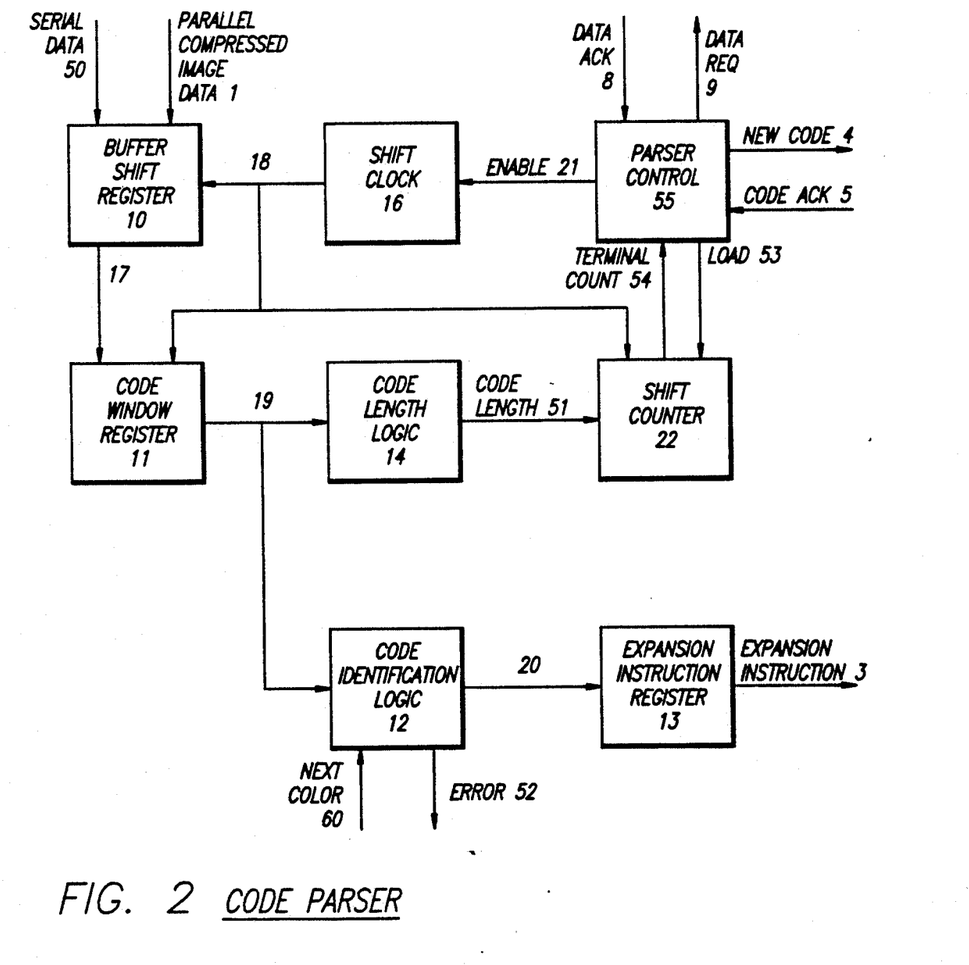
FIG. 2 is a schematic diagram illustrating in block form the code parser of FIG. 1 in additional detail.

At the same time that the code words are identified and separated from the input compressed image code stream 1, the length of the current code word is determined. The reference for determining the next code word is simultaneously moved to the first bit following the current code word in the input code stream. The codes are identified by using a sliding window which inputs to the code identification logic a subset of the code stream equal in length to the longest code word (FIG. 2).

As a result of the structure of the Huffman codes, a unique determination can generally be made of each code word by using the sliding window. However, since the CCITT Group III and Group IV codes are modified Huffman codes, in certain circumstances the code words cannot be identified uniquely until the result of the previous code word has been determined. In case ambiguity exists in determining the code word from the input code stream, logic is provided within the code parser 2 to cause the code parsing process to pause until the code expander 6 has finished processing the previous code word. The code parser 2 continues to process code information until (a) a code is encountered which designates the end of the code stream for a given image, (b) the code expander has output an image of a predesignated size or (c) an erroneous code is encountered within the input code stream.

CODE EXPANDER, GENERAL

The code expander 6 is an independent self-contained sequential logic circuit which can be programmed to create rasterized imagery. In one embodiment of this invention, the code expander 6 operates in conjunction with the code parser 2 to expand a compressed image by using a sequence of programs or instructions created by the code parser. Huffman algorithms typically encode a variety of features. In particular, in the case of CCITT Group III and Group IV codes, the features are (1) color runs of either black or white of unlimited lengths within a given raster line (horizontal mode) (2) vertical or almost vertical correlation between color change positions in sequential raster lines (vertical mode) and (3) constant color in a raster line associated with a color change in a previous raster line (pass mode).

As a result, the code expander 6 operates in several modes associated with the features to be expanded. These modes depend upon the operation code and operand data input provided to the code expander 6 by the code parser 2. The code expander 6 has a code expansion sequencer 24 (FIG. 3) which produces control signals in response to the input operation code and the operand for each type and size of feature to be expanded. The input program is processed one instruction at a time, resulting in the creation of a rasterized image feature by the code expander 6 for each instruction which is processed. The concatenation of all the features generated by the code expander 6 in sequence results in the generation of the complete expanded image 7.

The code expander 6 maintains a reference line memory representing a previous raster line. Since the current raster line is generated at the same time that the previous raster line is referenced and since the code expander operates in a flow-through manner without backtracking, the data being created in representation of the current line is written into the current line memory (36 or 37 in FIG. 3) incrementally as the reference line is accessed, creating a new reference line for subsequent processing.

Figure 9:
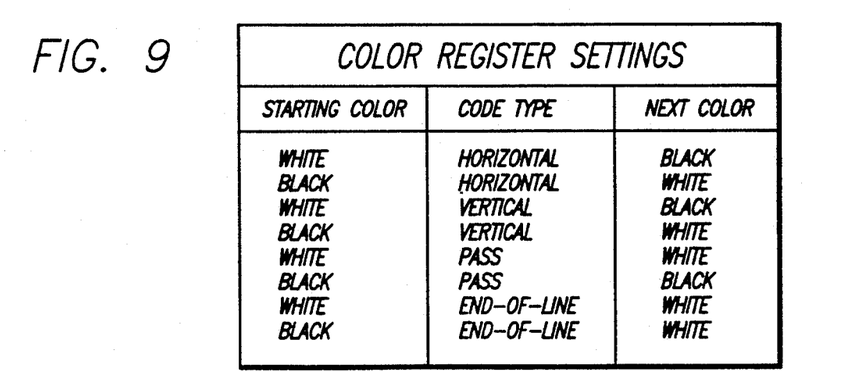
FIG. 9 is a table for setting Group III and Group IV colors in a color register shown in FIG. 3.

The output of the expanded image 7 is created sequentially by introducing a single bit into a shift register in synchronous relationship with a clock signal for each pel (pixel) being created. The color of the output bit is determined by sequential logic which uses a previous starting color and the current expansion instruction to determine the starting color for the start of the next instruction to be processed (FIG. 9). The expanded image data may be output in parallel from the shift register 32 in FIG. 3.

Two (2) sequential logic units control the output of a sequence of pels (pixels) for each instruction being processed depending upon the type of instruction. One logic unit controls horizontal color run-length output by counting the number of pels generated and halting when the run-length of pels is completed. A second logic unit controls pel output in response to features which are based on vertical or almost vertical correlation and also, in the case of CCITT Group III and Group IV codes, the pass mode. This logical unit utilizes a scanning window to reference the previous raster line and to identify the appropriate vertical correlation condition associated with the expansion instruction being processed. As the sliding window is moved relative to the previous raster line, pels (pixels) are output to form the current line being expanded. The size of the sliding window allows pels in directions forward and backward of the direction of pel generation to be referenced in order to determine the position of the correlation feature in the reference line. The purpose of this is to halt the processing of the current instruction being processed by the code expander when a halt condition is reached in the reference line.

As shown in FIG. 1, the code parser 2 and the code expander 6 operate in accordance with coded information introduced to them. For example, the code parser 2 receives the compressed image code 1, data acknowledge signal 8 and next color signal 60 and processes this information. The code parser 2 also receives a code acknowledge signal 5 from the code expander 6. The code parser 2 transmits a data request signal 9. The code expander 6 receives expansion instructions 3 and a new code 4 from the code parser 2 and processes this information to decompress the compressed information.

The code parser 2 receives the compressed image code 1 and detects this code. The detection of the code is enhanced by coded information relating to the length of the code. When the code has been detected, the code parser 2 passes instructions 3 to the code expander 6 to expand (or decompress) the compressed information in accordance with the detected code. When the code expander 6 receives the instructions to expand the compressed information, the code expander transmits a signal 5 to the code parser 2 to acknowledge that it has received such instructions.

At the same time, the code parser 1 sends data request signal 9 to the apparatus providing the compressed data so as to request the submission to the code parser of the information representing the subsequent code information. When the new information has been transmitted to the code parser 2, the code parser 2 receives a signal 8 acknowledging that such new information has been transmitted to the code parser.

CODE PARSER, DETAILED DESCRIPTION

The code parser 2 (FIG. 2) includes a buffer shift register 10 which receives the compressed image code data 1 typically in parallel words compatible with computer bus or data storage format. The buffer shift register 10 can optionally receive serial input data via serial input 50. The buffer shift register 10 maintains a data word so as to provide a code window register 11 with a continuous stream of data 17 without being interrupted as each code word is shifted out of the code window register 11 after it has been identified. The code window register 11 contains a sliding window of code bits at least as large as the longest possible code word.

Code identification logic 12 receives parallel code data through a sliding window 19 from the code window register 11 and determines whether a valid code word, aligned to the most significant bit of the code window register, is present in the code window register. The code identification logic 12 can provide this determination by using look-up tables whose size is equal to 2 raised to a power equal to the length of the longest possible code word. Optionally other forms of logic can be used to identify codes. FIGS. 4, 5, 6 and 7 contain and constitute code tables for CCITT Groups III and IV modified Huffman codes. These tables are known in the prior art. The code identification logic 12 generates as an output an expansion code instruction 20 and inputs this instruction to an expansion instruction register 13. The code information within the code window register 11 is also input to code length logic 14 which determines the length 51 of the identified code 20 and outputs the determined length to a shift counter 22.

If no valid code is present within the code window 19, an error signal is generated by the code identification logic 12. If a valid code, i.e. no error, is identified within the code window 19, parser control sequential logic 55 sends a load signal 53 to the shift counter 22 and also enables, as by a signal 21, a shift clock 16 to commence the generation of a clock 18. In this way, the code window 19 can be shifted to the start of the next code word as determined by the code length of the previous code word.

Figure 3:
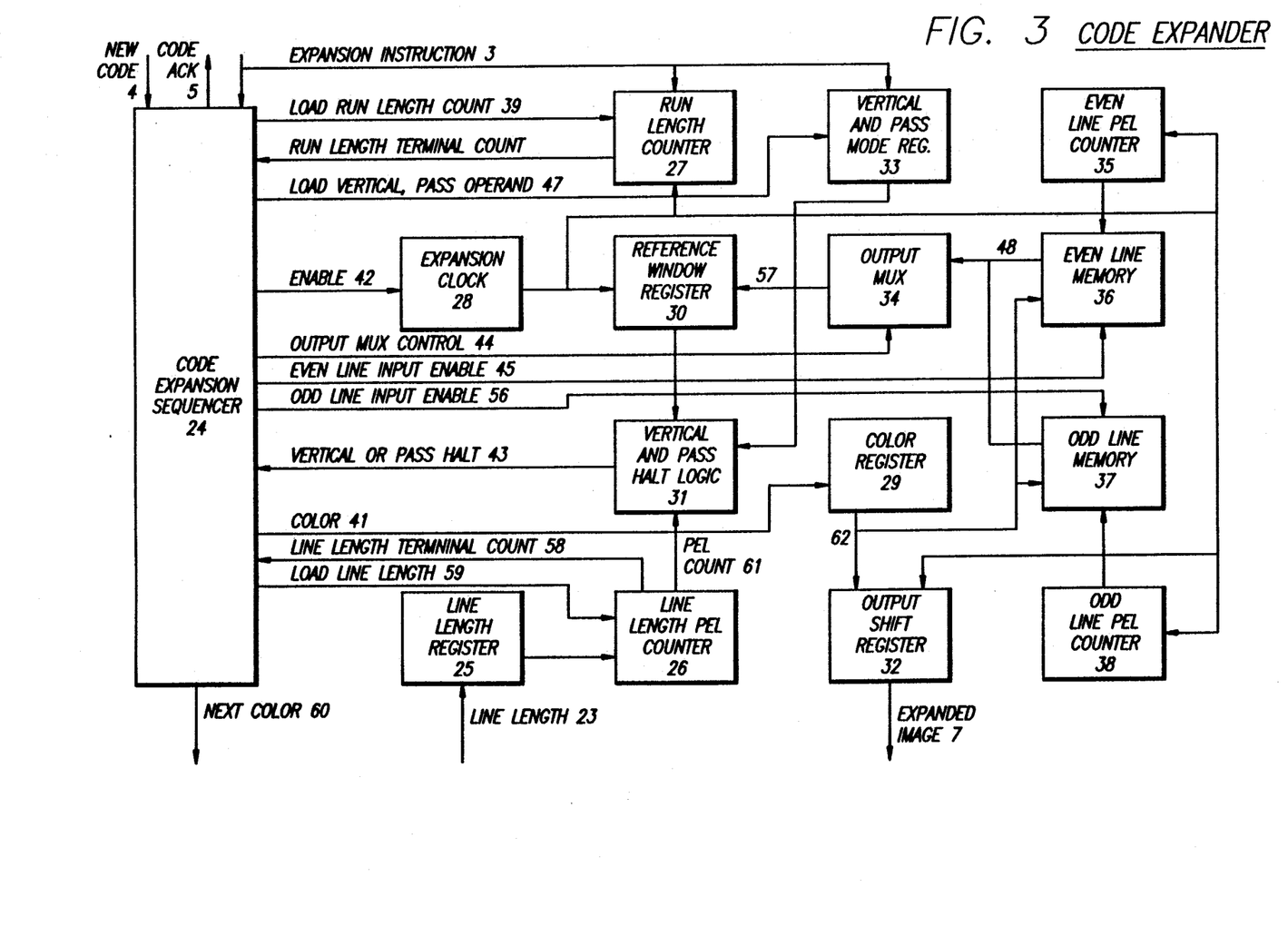
FIG. 3 is a schematic diagram illustrating in block form the code expander of FIG. 1 in additional detail.
Figure 5:
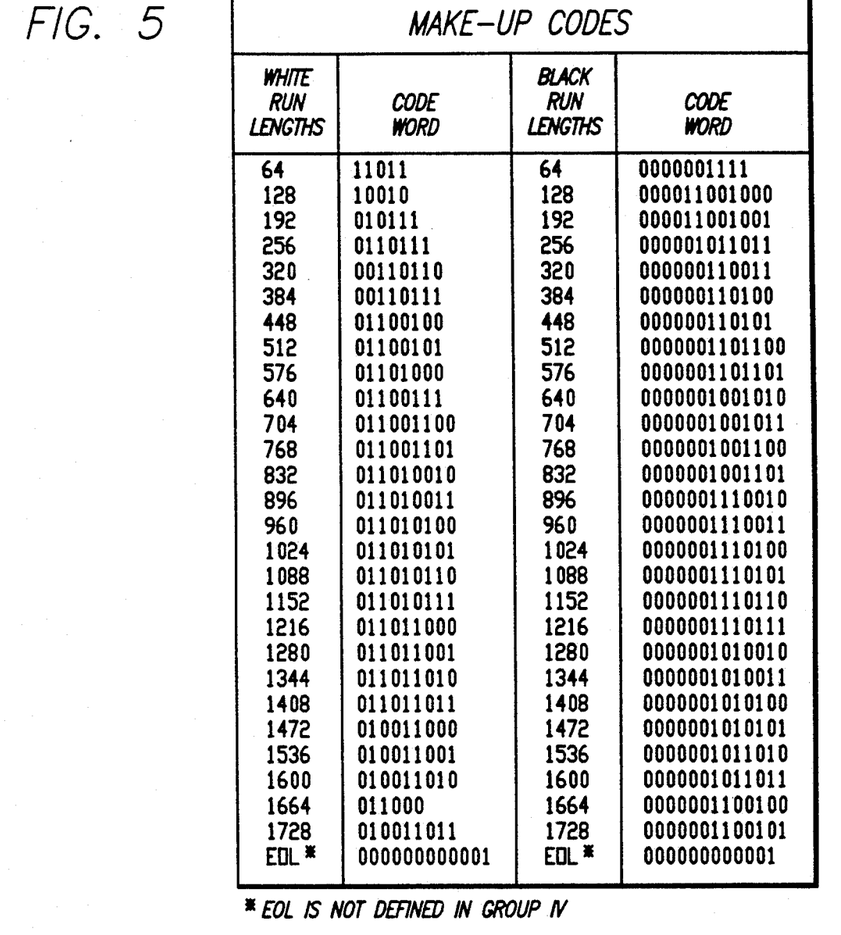
Figure 6:
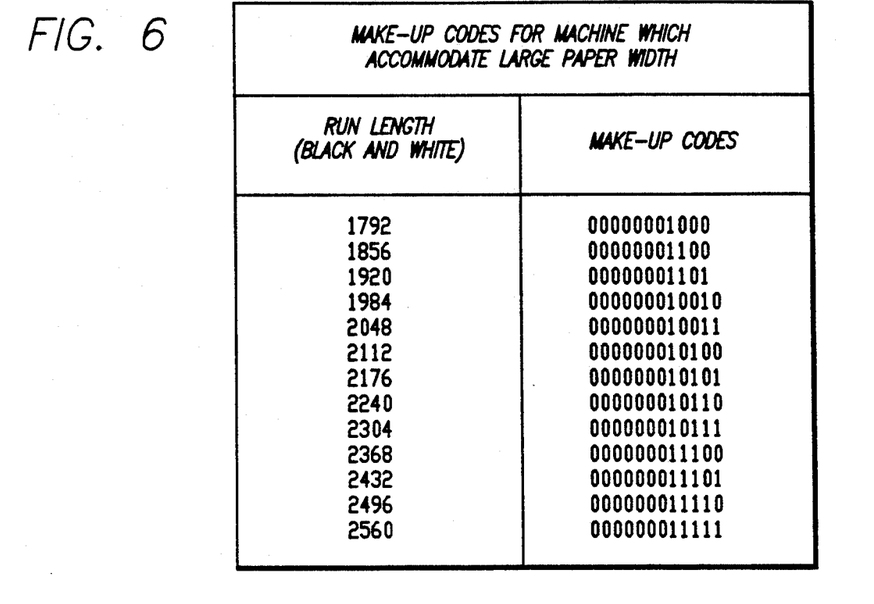
Figure 7:
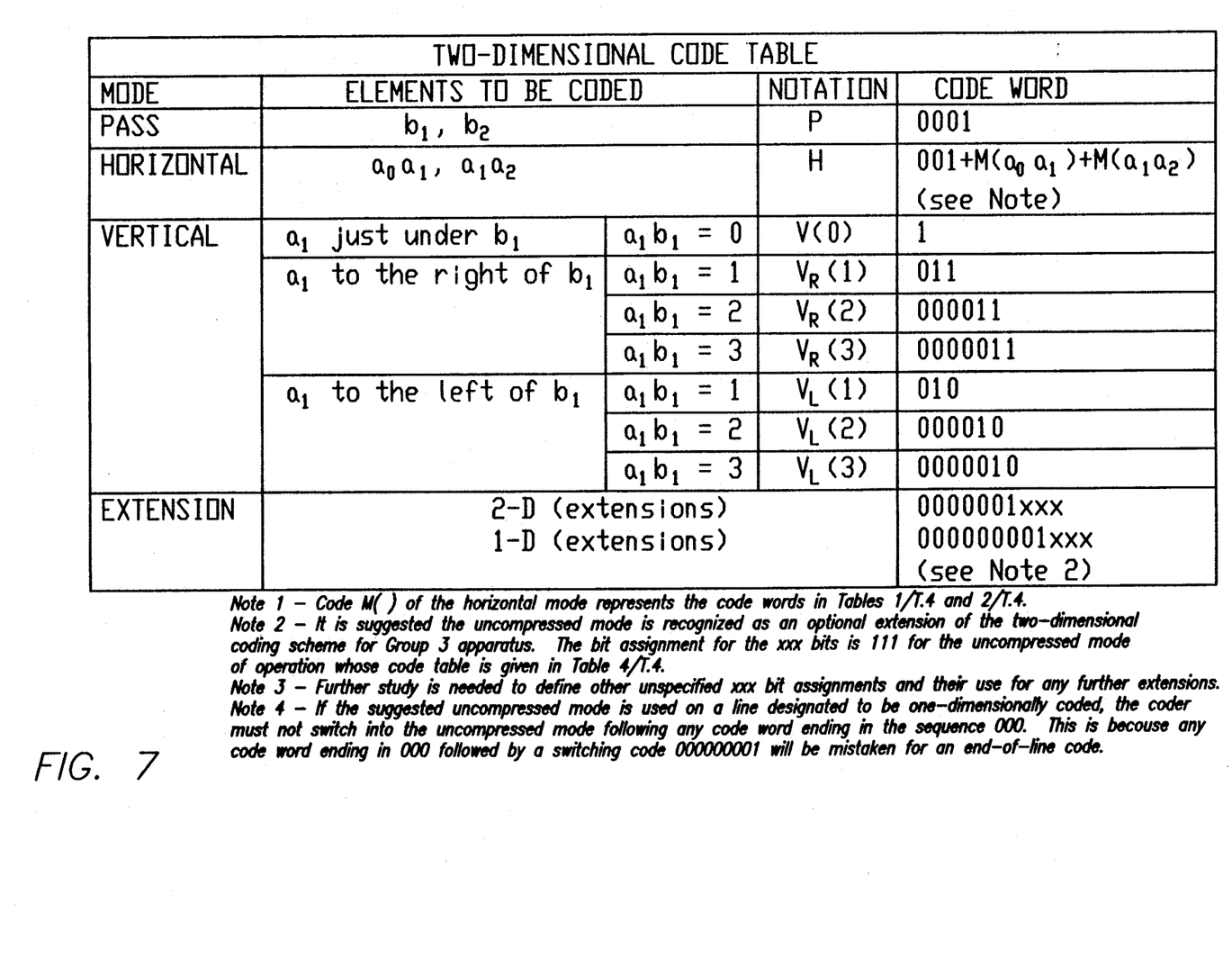

The shift counter 22 counts downwardly from the value of the previous code length and signals the parser control logic 55 that a terminal count 54 has been achieved. This enables the next code word to be identified. As each code word is identified and after the resulting expansion instruction has been loaded into the expansion instruction register 13, a new code signal 4 (FIGS. 1 and 2) is asserted. This new code signal 4 notifies the code expander 6 (FIG. 1) that a new expansion instruction is present. The code expander acknowledges the receipt of the expansion instruction via the code acknowledge signal 5 (FIGS. 1, 2 and 3).

The parser control logic 55 in FIG. 2 suspends further code identification until the control instruction has been accepted by the code expander 6. However, the shift clock 16 can operate, shifting the next instruction into place while the parser control 55 is waiting for the code acknowledge signal 5 from the code expander 6. The next instruction can be shifted into place under such circumstances since the current expansion instruction 3 is maintained within the instruction register 13. The parser control 55 generates requests for new data via the data request signal 9 (FIGS. 1 and 2) from the input code stream whenever a complete data word has been shifted out of the buffer shift register 10. When new data has been input, the parser control 55 receives the data acknowledge 8 signal from the external source. If no data is available, the parser control suspends the operation of the shift clock 16 until a new data word becomes available.

CODE EXPANDER, DETAILED DESCRIPTION

Figure 8:
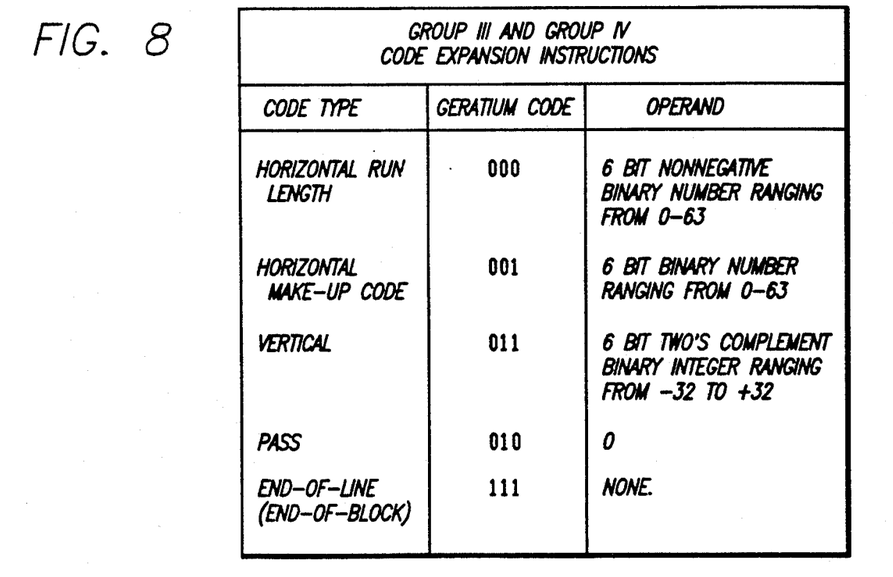
FIG. 8 is table of possible code instructions for expanding or decompressing the coded compressed image information.

The code expander 6 receives code expansion instructions. A possible set of these instructions is defined in FIG. 8. These instructions contain operation codes or parameter data as in the case of horizontal or vertical Group III and Group IV modes. Expansion operation codes are received by a code expansion sequencer 24 (sequential logic). Depending upon the expansion mode (horizontal, vertical or pass), the code expansion sequencer 24 controls the loading of parameter data into either a run length counter 27 or a vertical and pass mode register 33 with appropriate load signals 39 and 47, respectively.

For Group III and Group IV codes, the code expansion sequencer 24 sets the color in the color register 29 in accordance with the logic shown in FIG. 9. Once the parameter data has been loaded into the appropriate one of registers 27 and 33, the code expansion sequencer 24 enters into the operate mode, thereby enabling the expansion clock 28. The expansion clock 28 generates a clocking signal to an even line pel (pixel) counter 35, an odd line pel counter 38, a line length pel counter 26, a reference window register 30 and an output shift register 32. The reference window register 30 and the output shift register 32 operate to shift data.

The even line pel counter 35 generates addresses which input to the even line memory 36 in order to access the image data from the previous line whenever an odd line is being expanded. The odd line pel counter 38 generates addresses in order to input expanded data to the odd line memory 37 whenever an odd line is being expanded. The even and odd line memories 36 and 37 switch roles as each successive line is expanded. Thus, one line memory becomes the reference line and the other line memory receives the expanded line output. Although two (2) memories 37 and 38 are shown in FIG. 3, it will be appreciated that the memories 37 and 38 may be consolidated into a single memory with expanded capacity. Actually, a direct comparison may even be made between the signals in one line and the signals in a memory from a previous line.

The code expansion sequencer 24 maintains control over the selection of the even line and odd line memories 36 and 37 by controlling an output mux (multiplexer) 34 and providing even line input enable and odd line input enable signals 45 and 56 for each successive line expanded. The output from the output mux 34 is input to the reference window register 30 serially as at 57. The reference window register 30 provides a sliding window which passes over the reference line at each instant to provide access from vertical and pass halt logic 31 to reference image data both forward of, and previous to, the current expanded image pel being output as at 62.

The vertical and pass halt logic 31 determines the pel (pixel) position which completes the processing of a code based on color changes in the reference (previous) raster line. The parameter stored within the vertical and pass mode register 33 determines the particular position, within the sliding window relative to the expanded line pel position, that a color change results in a halt condition in the continued generation of a particular color.

The expansion clock 28 continues to operate until one of three conditions occurs:

1. A halt condition is determined by the vertical and pass mode halt logic 31 in pass or vertical mode;

2. The run length counter 27 completes the count of a run length in horizontal mode; or 3. The line length pel counter 26 has reached a count equal to the length of an image raster line.

Coincident with each clock cycle of the expansion clock 28, a pel (pixel) is output.

When the line length count is reached, the code expansion sequencer 24 resets the line length pel counter 26 to the line length value stored in the line length register 25, switches the roles of the even and odd line memories 35 and 36 and awaits a request from the code parser of FIG. 2 for a new instruction.

For a given line being expanded, when the pel output stream reaches a position such that the reference window includes the last pel of the previous line, a special provision within the vertical and pass halt logic 31 handles end-of-line processing. To account for image changes after the reference pel in a line, the end-of-line logic treats the data within the reference window register 30 as if both white-to-black and black-to-white color changes have occurred after such last reference pel.

As a result of the asynchronous relationship between the code parser 2 (FIG. 1) and the code expander 6, the two are able to operate in an overlapped manner such that the input code stream can be processed by the code parser while the code expander is outputting the expanded image stream. As can be observed by a review of the CCITT Group III and Group IV run length codes, the color of a run length should be known apriori before a unique run length code can be identified in the code stream in certain circumstances. To handle this situation, the code parser 2 is able to decide when a unique code can be identified without knowing the color apriori. In this circumstance, the code parser can proceed to identify the next code word in the code stream. When the code word cannot be uniquely identified without knowing the next color, the code parser code identification logic 12 in FIG. 2 does not make a determination of the code word until the code expander has completed the expansion of the previous code word and the ending color can be determined. The ending color is unknown for a given expansion code only if the completion of the current line could occur and the starting color for the subsequent code would normally be black as prescribed in FIG. 9.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

REFERENCES (1) EIA Standard RS-465, Group 3 Facsimile Apparatus for Document Transmission, Electronic Industries Association, May 1981.

(2) FED-STD-1065, Telecommunications: Facsimile Coding Schemes and Coding Control Functions For Group 4 Facsimile Apparatus.

We claim:

1. In combination for decompressing compressed image information coded in words in successive lines in a raster scan, the information being in the form of pixels, means for decoding to an intermediate code the compressed image information coded in the words in each of the successive lines in the raster scan, means responsive to the intermediate code in the words in each of the successive lines for decompressing each intermediate code to obtain the image information, means for providing a reference window for operation upon a particular number of sequential pixels in each of the successive lines, memory means for storing the decompressed image information for the line previous to the line being processed, means for introducing to the reference window means the compressed information for each line being processed and the decompressed image information stored in the memory means for the line previous to such line, mean for advancing the reference window means to the successive pixels in each line in accordance with the raster scan, and means responsive to the intermediate code in each line for decompressing the compressed image information in the reference window means in such line in accordance with the image information in the reference window means for such line and for the previous line.

2. In a combination as set forth in claim 1, the reference window means having a leading edge and a trailing edge, the decompressing means including means for determining when the reference window means has advanced the leading edge of the reference window means to the end of each line and for thereafter processing the information in the reference window means in such line on an individual basis until the trailing edge of the reference window means advances to the end of such line where the individual basis is different from the processing of the information in such line prior to the advance of the reference window means to the end of such line.

3. In a combination as set forth in claim 1,
the decompressing means including means operative upon the information in each line in the reference window means, in accordance with the coded information in such line, to compare the information in the reference window means for each successive pixel in such line with the decompressed information in the reference window means for the previous line at particular pixels in such previous line within the window means ahead of, at the same position as or behind each such successive pixel being processed in such line.

4. In a combination as set in claim 2,
the decompressing means including means responsive to the coded words in the intermediate form in each of the successive lines for comparing on a parallel basis in the reference window means, in accordance with the coded information in the intermediate form in each such successive line, the information for each successive pixel within the reference window means in each such line and the information for such previous line at particular pixels within the reference window means in such previous line ahead of, at the same position as or behind such pixels.

5. In combination for decompressing compressed image information coded in words in successive lines in a raster scan, the information being in the form of pixels, the information being coded for first ones of the lines for decompression in accordance with differences and similarities in the information between such first lines and the preceding lines and being coded in other ones of the lines for decompression only in accordance with the information in such other lines,
first means for receiving the compressed image information coded in the words in each of the successive lines,
second means for decoding the coded information in the words in each of the successive lines to an intermediate form,
third means for storing the decompressed information for each line after such information has been decompressed,
fourth means for providing for the decompression of the compressed information in each of the first lines in accordance with the coded information in the intermediate form for such line and the stored decompressed information for the preceding line,
fifth means for providing for the decompression of the information in each of the other lines only in accordance with the coded information in the intermediate form for such line, and
sixth means for providing for individual activations, for each of the first lines and each of the other lines, of the respective ones of the fourth and fifth means in accordance with the coded information in the intermediate form for each such line.

6. In combination as set forth in claim 5,
the second means being operative asynchronously with respect to the decompression provided by each of the fourth and fifth means to provide for the decoding of the coded information in progressive words in each of the successive lines to the intermediate form while the fourth and fifth means are decompressing the coded information in the words previous to such progressive words in such line.

7. In combination as set forth in claim 5,
the fourth means for each of the first lines including a reference window providing information in a limited number of sequential pixels in each first line and in the preceding line to obtain the information in the reference window for such first line in accordance with the information for the preceding line in the reference window and the coded information in the intermediate form for such first lines and further including seventh means for advancing the reference window along each first line, without any backtracking in such first line, to decompress the information in the reference window for such first line.

8. In a combination as set forth in claim 5,
the information being disposed in successive pixels in each first line and the preceding line,
the fourth means for such first line being responsive at each of the successive pixels in such first line, in accordance with the coded information in the intermediate form in the words in such first line, to the information in the preceding line at the pixel coincident with such successive pixel in such first line or within a particular number of pixels before or after such successive pixel in such first line.

9. In a combination as set forth in claim 6,
the second means being operative to decode the next word in each successive line only after the fourth and fifth means have decompressed the information for the word being processed in such successive line when the color of the information in such next word in such successive line cannot be identified until after the information for the previous work in such successive line has been decompressed.

10. In combination for decompressing compressed image information coded in words in successive lines in a raster scan,
first means for receiving the compressed image information coded in the successive words in each of the successive lines in the raster scan,
code parser means for decoding to an intermediate form the compressed image information coded in the successive words in each of the successive lines,
second means responsive to the decoding to the intermediate form of the coded information in the successive words in each of the successive lines for decompressing the compressed image information in each of the successive words in such successive line in accordance with the coded information in such words in the intermediate form,
third means for obtaining the operation of the second means in decompressing the compressed image information for each word in each successive line while the code parser means are decoding to the intermediate form the compressed image information coded in the next word in such successive line when the color for such next word is known before the completion of the decompression of the compressed image information for the word being decompressed in such successive line, and
fourth means for obtaining the operation of the second means in decompressing the compressed image information in each individual word in each successive line in synchronism with the decoding to the intermediate form of the compressed image information in such word when the color for the next word in such successive line is unknown before the completion of the decompression of the compressed image information for the previous word in such successive line.

11. In a combination as set forth in claim 10, means for storing the decompressed image information for the successive words in each line and fifth means included in the second means for decompressing the compressed image information for each word in each line in accordance with the information coded in the intermediate form for such word by the code parser means and the compressed information for such word in such line and the decompressed image information stored for the successive words in the previous line.

12. In a combination as set forth in claim 10, the image information for the successive words in each line being provided in a number of successive pixels, fifth means for storing the decompressed image information for the successive pixels in each line, sixth means for providing a reference window for the compressed image information in a number of successive pixels in each individual line and for the decompressed image stored for such successive pixels in the previous line, seventh means for advancing the reference window through the successive pixels in each line, and eight means including the third means for decompressing the compressed image information in the reference window for the successive pixels in each individual line in accordance with the information coded in the intermediate form for the successive pixels in such individual line and the compressed image information in the reference window for such individual line and the decompressed image information in the reference window for the previous line.

13. In a combination as set forth in claim 12, the reference window having leading and trailing edges, ninth means for providing a particular indication when the leading edge of the reference window has advanced to the end of each line, and means responsive to the particular indication form the ninth means for each line for providing an individual processing, different form the previous processing in such line, of the compressed information in the reference window for such line until the trailing edge of the reference window has advanced to the end of such line.

14. In combination for decompressing into a plurality of pixels compressed image information coded in words in successive lines in a raster scan, means for receiving the compressed image information coded in the words in the lines in the raster scan, code parser means for decoding the coded information to an intermediate code, counter means for providing a run of the same color in a plurality of successive pixels in particular ones of the lines in the raster scan, vertical mode reference means for recording the color information at successive pixels in each individual line other than the particular lines in accordance with the color information related pixels in the line immediately preceding such individual line, mean for activating a particular one of the counter means and the vertical mode reference means in accordance with the information in the intermediate code from the code parser means, the vertical mode reference means including:

reference window means for storing a particular number of pixels in each line and in the immediately preceding line, means for scanning the progressive pixels in each line and for advancing the reference window means, without any backtracking of the scanning of the pixels in such line, in accordance with such progressive scanning, and means for comparing the information in the progressive pixels scanned for each word in each line with the information at particular pixels in the reference window means for the immediately preceding line to decompress the compressed information for such word in such line.

15. In a combination as set forth in claim 14, the comparing means being operative to compare the information in each pixel being scanned in the reference window means for each word in each line with the information in the pixels in the reference window means for the immediately preceding line, the compared information in the pixels in the preceding line being disposed in the reference window mean ahead, coincident with or behind the pixel being scanned in each word in each line in accordance with the intermediate code of such word from the code parser means.

16. In a combination as set forth in claim 14, means for providing for the intermediate coding of the coded information in each word in each line by the code parser means during the decompression of the compressed image information for the previous word in such line when the color of the decompressed image information for the previous word is known before the decompression of the compressed image information for such previous word has been completed, and means for providing for the intermediate coding of the coded information in each word in each line by the code parser means after the decompression of the compressed image information for the previous word in such line when the color of the decompressed image information for such previous word is not known before the decompression of the compressed image information for such previous word has been completed.

17. In a combination as set forth in claim 16, means included in the code parser means for producing an operation and operand code of the coded information for each word in each line, and the activating means being responsive to the operation and operand code for each word in each line from the code parser means for activating a particular one of the counter means and the vertical mode reference means for such line in accordance with the operation and operand code to decompress the compressed image information in such line.

18. In a combination as set forth in claim 15, means for providing for the intermediate coding of the coded information in each word in each line during the decompression of the compressed image information for the previous word in such line when the color of the decompressed image information for such previous word is known before the decompression of the compressed image information for such previous word has been completed, means for providing for the intermediate coding of the coded information in each word in each line after the decompression of the compressed image information of the previous word in such line when the color of the decompressed image information for such previous word is not known before the decompression of the compressed image information for such previous word has been completed, the reference window means having lading and trailing edges, and means responsive to the movement of the leading edge of the reference window means to the end of each line for processing the information in the reference window means, in an individual manner different from the processing of the information in the reference window means before the end of such line, until the moment of the trailing edge of the reference window means to the end of such line.

19. In a combination as set forth in claim 18, wherein the last mentioned means processes the information in the pixels in the reference window means as if both white-to-black and black-to-white changes have occurred.

20. In combination for decompressing compressed image information coded in words in successive lines in a raster scan, the information being in the form of pixels, means for decoding to an intermediate code the compressed image information coded in the words in the successive lines in the raster scan, means for providing for the decoding to the intermediate code of each word line each line by the code decoding means during the decompression of the compressed image information for the previous word in such line when the color of the decompressed image information for the previous word in such line is known before the decompression of the compressed image information for the previous word in such line has been completed, means for providing for the decoding of the intermediate code for each word in each line by the code decoding means after the decompression of the compressed image information for the previous word in such line when the color of the decompressed image information for such previous word is not known before the decompressed image information for such previous word has been completed, and means responsive to the intermediate code for each word in each line for decompressing the compressed image information for such word in such line.

21. In a combination as set forth in claim 20, the image information for each line being provided in a number of successive pixels, means for storing the decompressed image information for the successive pixels in each line, means for providing a reference window for the compressed image information in a number of successive pixels in each line and for the decompressed image stored for such successive pixels in the immediately preceding line, means for advancing the reference window through the successive pixels in each line without backtracking to previous pixels in such line, and means included in the decompressing means for decompressing the compressed image information in the reference window for each line in accordance with the information decoded for such individual line and the decompressed image information in the reference window for the immediate preceding line.

22. In a combination as set forth in claim 21, the reference window having leading and trailing edges, means for providing a particular indication when the leading edge of the reference window has advanced to the end of each line, and means responsive to the particular indication form the last mentioned means for each line for providing an individual processing of the compressed information in the reference window means for such line, different from the processing of the information in such line before the leading edge of the reference window has advanced to the end of such line, until the trailing edge of the reference window has advanced to the end of such line.

23. In a combination as set forth in claim 1 wherein the advancing means advances the reference window means in each line without any backtracking of the reference window means in such line.

24. In a combination as set forth in claim 2 wherein the advancing means advances the reference window mean in each line without any backtracking of the reference window means in such line and wherein the decompressing means includes means operative upon the information in each line in the reference window means, in accordance with the coded information in such line, to compare the information in the reference window means for each successive pixel in such line with the decompressed information in the reference window means for the previous line at pixel positions ahead of, at the same position as and behind such successive pixel in such line.

25. In a combination recited in claim 1, means included in the decoding means for producing an operation and operand code of the coded information in the intermediate form for each word in each line, and the decompressing means being responsive to the operation and operand code for each word in each line for decompressing the compressed image information in accordance with the image information in the reference window means for such line and for the previous line.

26. In a combination as recited in claim 5, the second means being operative to produce an operation and operand code of the coded information in the intermediate form for each word in each line, and the sixth means being responsive to the operation and operand code for each word ion each line for providing for individual activations, for each of the first lines and each of the other lines, of the respective ones of the fourth and fifth mean in accordance with operation and operand code for such word in such line.

27. In a combination as set forth in claim 11, the code parser means including means for producing an operation and operand code in the intermediate form of the coded information for each word in each line, and the second means being responsive to the operation and operand code for each word in each line for decompressing the compressed image information in such word in such line.

28. In a combination as set forth in claim 21 wherein the last mentioned means processes the information in the reference window means as if both white-to-black and black-to-white changes have occurred.

* * * * *